United States Patent
Gruber et al.

[11] Patent Number: 5,899,187
[45] Date of Patent: May 4, 1999

[54] ENGINE ARRANGEMENT

[75] Inventors: Friedrich Gruber, Hippach; Erwin Melmer, Terfens, both of Austria

[73] Assignee: Jenbacher Energiesysteme Aktiengesellschaft, Jenbach, Austria

[21] Appl. No.: 08/883,880

[22] Filed: Jun. 27, 1997

[30] Foreign Application Priority Data

Jul. 11, 1996 [AT] Austria ................................ 1245/96

[51] Int. Cl.$^6$ ............................................. F02B 77/00
[52] U.S. Cl. ...................................... 123/198 R; 123/1 A
[58] Field of Search ................................ 123/1 A, 198 R

[56] References Cited

U.S. PATENT DOCUMENTS

| | | | |
|---|---|---|---|
| 3,466,138 | 9/1969 | Spiegler . | |
| 4,381,755 | 5/1983 | Caracciolo | 25/6 |
| 4,523,548 | 6/1985 | Engel et al. | 123/1 A |
| 5,724,948 | 3/1998 | King et al. | 123/1 A |

FOREIGN PATENT DOCUMENTS

| | | | |
|---|---|---|---|
| 0638349 | 6/1994 | European Pat. Off. . | |
| 0747110 | 12/1996 | European Pat. Off. . | |
| 302030 | 5/1992 | Germany | F02B 43/00 |
| 8402283 | 6/1984 | WIPO . | |

*Primary Examiner*—Noah P. Kamen
*Attorney, Agent, or Firm*—Lorusso & Loud

[57] ABSTRACT

An engine arrangement having a gas engine, an exhaust gas tract with an exhaust gas catalytic converter in the exhaust gas tract, a propellent gas feed tube connecting a gas supply to the engine, and a cleaning device in the gas feed line.

21 Claims, 2 Drawing Sheets

ENGINE ARRANGEMENT

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO A "MICROFICHE APPENDIX"

Not applicable.

BACKGROUND OF THE INVENTION

1. Field of the Invention

The invention concerns an engine arrangement having a gas engine, in the exhaust gas tract of which there is preferably arranged an exhaust gas catalytic converter. Arranged in the propellent gas feed line to the gas engine is at least one cleaning device for the adsorptive cleaning of the propellent gas, which includes a regeneration device for regeneration of the adsorption agent.

2. Description of the Related Art

When using internal combustion engines (gas engines) for using the energy of biogases (in particular sewer gases or disposal site gases), the use of an exhaust gas catalytic converter has hitherto not been economically meaningful because trace substances contained in the propellent gas have a strongly adverse effect on the activity of the exhaust gas catalytic converter in a short period of time.

It is already known that the propellent gas can be freed of catalyst poisons by means of an adsorptive cleaning device (U.S. Pat. No. 4,523,548 A).

The capacity of the adsorption agent (in particular activated carbon) is limited. It was therefore hitherto frequently necessary to replace the adsorption agent at or shortly before attainment of a condition of saturation. Since the replacement of the adsorption agent by a fresh adsorption agent and disposal of the charged adsorption agent represents a considerable cost factor, it has already been proposed that the adsorption agent should be regenerated, in particular by being heated (U.S. Pat. No. 4,523,548 A). In that regeneration operation the adsorption agent can remain in the cleaning device. It is only freed of the trace substances (biogas accompanying substances or impurities) adsorbed from the propellent gas. In U.S. Pat. No. 4,523,548 A however the trace substances which are driven out of the adsorption agent are fed to the engine again, which in accordance with the object of the present invention is precisely to be prevented.

BRIEF SUMMARY OF THE INVENTION

In accordance with the invention therefore it is provided that the regeneration device includes a device for passing a combustible flushing or scavenging gas through the cleaning device and a device for subsequent combustion of the flushing or scavenging gas together with the accompanying substances entrained thereby from the adsorption agent.

Regeneration therefore preferably effected by heating the adsorption agent and by flushing same with a clean combustible flushing gas which is then burnt together with the entrained trace substances. The engine receives only cleaned gas.

It has been found that there is a high degree of probability that particular organic silicon compounds (so-called siloxanes, in particular hexamethyldisiloxane ($C_6H_{18}OSi$) and octamethyl-cyclotetrasiloxane ($C_8H_{24}O_4Si_4$)) in the propellent gas are harmful to the catalyst. As the applicants' tests have shown the above-mentioned catalyst poisons can be removed from the propellent gas by means of an activated carbon filter as the adsorption agent. In general suitable adsorption agents will be adopted, depending on the respective trace substances to be removed from the propellent gas.

BRIEF DESCRIPTION OF THE DRAWING

Further advantages and details of the invention are described in greater detail hereinafter with reference to the following specific description. In the drawing.

DETAILED DESCRIPTION OF THE PREFERRED EMBODIMENT

Figure 1:
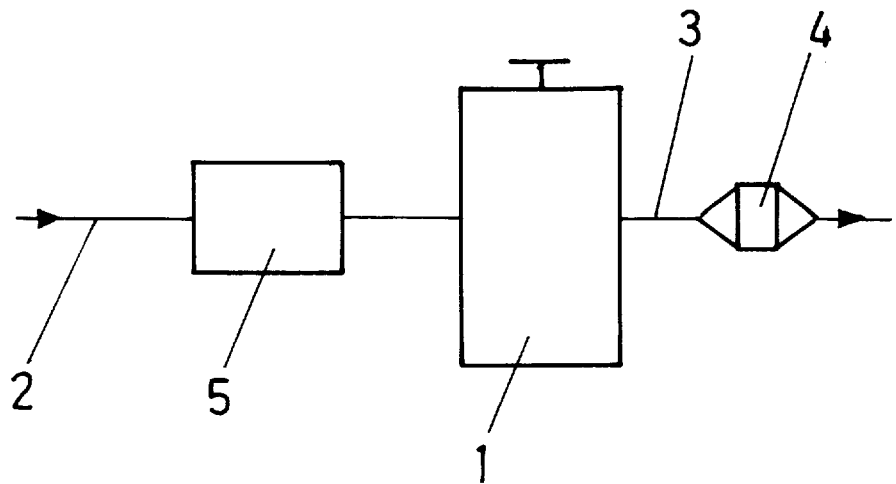
FIG. 1 is a diagrammatic view of an embodiment of an engine arrangement according to the invention.

In the embodiment illustrated in FIG. 1, reference numeral 1 diagrammatically denotes an internal combustion engine operated with gas (gas engine) which is supplied with biogas (in particular sewer gas or disposal site gas) by way of a propellent gas feed line 2. The gas engine may be in particular a large stationary gas engine. An exhaust gas catalytic converter 4 is provided in the exhaust gas tract 3 of the gas engine.

A cleaning device 5 for adsorptive cleaning of the propellent gas is arranged in the propellent gas feed line 2 to the gas engine 1.

The cleaning device 5 may advantageously include an activated carbon filter as an adsorption agent. The use of such a cleaning device 5 can substantially increase the operating lives of the exhaust gas catalytic converter 4, so that the use of such an exhaust gas catalyter converter 4 in connection with gas engines operated with biogases is for the first time meaningfully possible. A reduction in the total pollutants given off can in turn be achieved by way of the exhaust gas catalytic converter 4.

Figure 2:
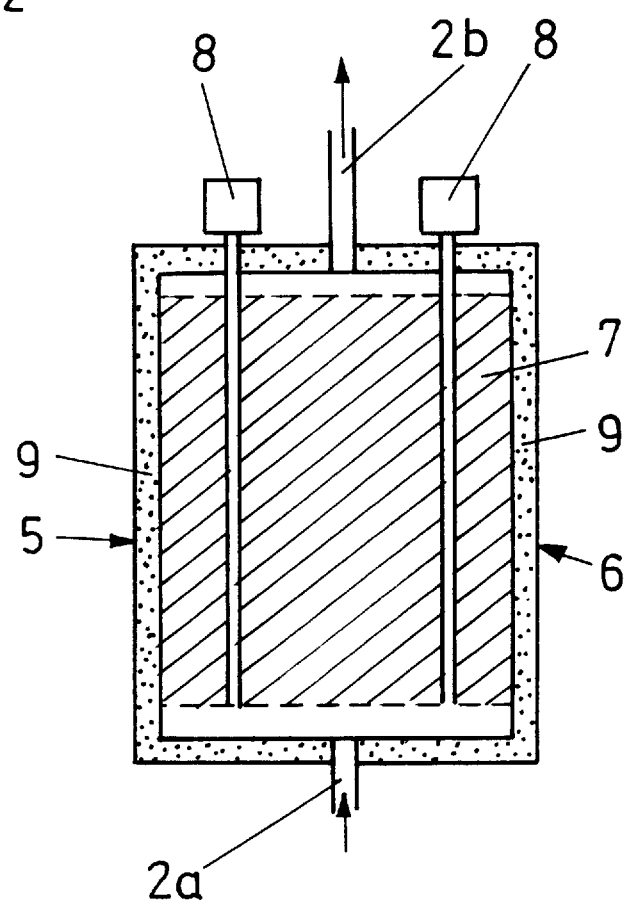
FIG. 2 shows the structure of an embodiment of a cleaning device according to the invention.

In the case of the cleaning device 5 shown in FIG. 2 an activated carbon filter 7 is disposed as an adsorption agent in a housing 6. A narrow-pore water vapor-activated carbon on a pit coal basis with a shaking density of about 500 kg/m³ is particularly suitable. The propellent gas to be cleaned flows through the activated carbon filter 7, and the contaminated propellent gas flows in by way of the feed line connection 2a of the propellent gas feed line. The cleaned propellent gas leaves the cleaning device 5 by way of the feed line connection 2b.

In order to be able to regenerate the adsorption agent from time to time (for example every week), in accordance with the invention there is provided a regeneration device. It advantageously has a heating device 8 for heating the adsorption agent 7 (preferably activated carbon). In the embodiment illustrated in FIG. 2 the heating device 2 has electrical heating elements which extend into the activated carbon 7. It is possible by means of the heating elements to heat the activated carbon to a temperature of between 350° C. and 450° C. At the same time, in the regeneration operation, the activated carbon is flushed with small amounts of a combustible flushing gas, in particular a cleaned and preheated propellent gas. The trace substances (biogas accompanying substances) which are driven out of the activated carbon by the heating effect previously adsorbed from the biogas) are then burned together with the flushing gas in a torch flare, as is shown by way of example in FIG. 3. In order to avoid energy losses due to radiation, the adsorption agent 7 is disposed in a container 6 whose walls are provided with thermal insulation 9 (FIG. 2). After a heating time of for example several hours the activated carbon is cooled down and the flushing action by means of a flushing gas is stopped. The adsorption agent is now regenerated, that is to say, it is suitable for receiving unwanted trace substances from the propellent gas.

Figure 3:
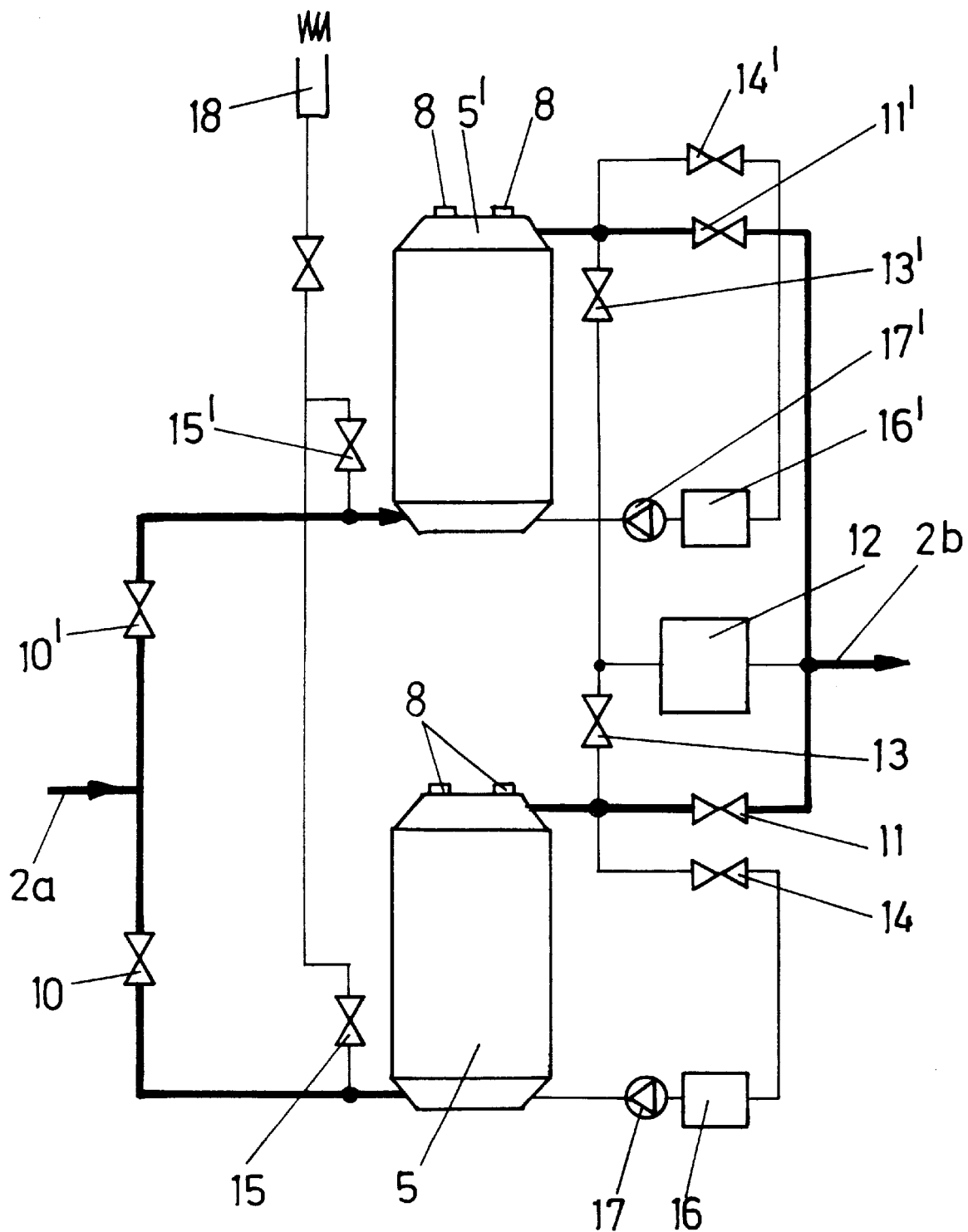
FIG. 3 shows an embodiment of an engine arrangement according to the invention with two parallel cleaning devices together with a regeneration device.

In order to avoid interruption of the operation or the engine during regeneration of the adsorption agent 7, in accordance with a preferred embodiment of the invention there may be two parallel cleaning devices 5, 5', wherein the propellent gas to be cleaned can be passed selectively by way of one of the cleaning devices while the adsorption agent 7 of the other cleaning device is being regenerated (FIG. 3). The embodiment shown in FIG. 3 therefore has two cleaning devices 5 and 5' which are preferably of the same structure. In principle these may essentially involve containers which are filled with activated carbon, as are shown in FIG. 2. In operation for example the cleaning device 5 which is the lower device in FIG. 3 is active while the upper cleaning device 5' is either in a rest condition or is being regenerated, as is described hereinafter: the electromagnetic valves 10' and 11' are accordingly closed while the electromagnetic valves 10 and 11 are open. The propellent gas now flows by way of the feed line connection 2a and the opened electromagnetic valve into the cleaning device 5. There the propellent gas is cleaned and then flows in the cleaned condition by way of the open electromagnetic valve 11 and the feed line connection 2b to the gas engine (not shown). As already mentioned the capacity of the adsorption agent (activated carbon) in the cleaning device 5 is limited. As soon as a condition of saturation occurs (or shortly before) the arrangement is switched over to the cleaning device 5' which is the upper device in FIG. 3 and which has an adsorption agent which still has its full capacity. In order to avoid disturbances in operation in the switching-over procedure, both cleaning devices 5 and 5' may also be simultaneously active for a brief period of time.

After the switching-over procedure is concluded the electromagnetic valves 10' and 11' are opened while the electromagnetic valves 10 and 11 are closed. The adsorption agent in the cleaning container 5 can now be regenerated. For that purpose the heating elements 8 are first switched on, whereupon the activated carbon is heated to about 350° C. to 450° C. In addition cleaned propellent gas which has been preheated in the heating device 12 flows into the cleaning device 5 by way of the opened electromagnetic valve 13. In that situation, besides the electromagnetic valves 10 and 11, the electromagnetic valves 13', 14 and 14' and 15' are also closed. The cleaned and preheated propellent gas (biogas) which is thus used as a flushing gas now entrains the biogas accompanying substances (trace substances) driven out of the adsorption agent and flows by way of the opened electromagnetic valve 15 to a torch flare 18 where burning takes place. The torch flare 18 may have a permanent ignition system to enable it to always ignite any flushing gas that arrives there.

After a heating time of several hours the adsorption agent is cooled down. For that purpose the heating elements 8 are first switched off and flushing with flushing gas is interrupted by closing the electromagnetic valve 13. The electromagnetic valve 15 is also closed. However the electromagnetic valve 14 is opened and a cooling circuit which goes by way of the radiator 16 and a circulation fan 17 is closed. In that way the adsorption agent in the cleaning container 5 can be quickly cooled down in spite of the good heat insulation of the container.

Regeneration of the cleaning device 5' can then be effected later in a similar manner, in which case the components shown therein are denoted by the same references but with the inclusion of a prime, like the components associated with the cleaning device 5 that is the lower device in FIG. 3.

We claim:

1. A gas engine system comprising a gas engine;
   a propellent gas conduit connecting a propellant gas source to the gas engine for delivering gas fuel to the gas engine;
   at least a first cleaner in the propellent gas conduit for cleaning propellant gas as it passes through the propellant gas feed line, the first cleaner comprising
      a first adsorption agent for adsorbing impurities or accompanying substances from propellant gas,
      a first regenerator for regenerating the first adsorption agent,
      the first regenerator comprising piping adapted for passing a combustible flushing gas through the first adsorption agent, and a burner for subsequent combustion of flushing gas and any impurity or accompany substance entrained by flushing gas out of the first adsorption agent.

2. The gas engine system of claim 1 further comprising a flushing gas source for supplying flushing gas to the first regenerator, the flushing gas source containing cleaned propellant gas.

3. The gas engine system of claim 2 further comprising a flushing gas source for supplying flushing gas to the first regenerator, the flushing gas source containing preheated gas.

4. The gas engine system of claim 1 wherein the burner comprises a torch flare.

5. The gas engine system of claim 4 wherein the torch flare has a permanent ignition system.

6. The gas engine system of claim 1 further comprising a propellant gas source connected to the propellant gas conduit for supplying propellant gas to the gas engine.

7. The gas engine system of claim 1 wherein the propellant gas source contains a biogas.

8. The gas engine system of claim 1 wherein the propellant gas source contains a sewer gas.

9. The gas engine system of claim 8 wherein the propellant gas source contains a disposal site gas.

10. The gas engine system of claim 6 wherein the first adsorption agent is adapted to adsorb organic silicon compounds.

11. The gas engine system of claim 10 wherein the first adsorption agent is an activated carbon filter.

12. The gas engine system of claim 1 wherein the activated carbon filter is a narrow-pore, water vapor-activated carbon.

13. The gas engine system of claim 12 wherein the activated carbon filter has a density of between 400 kg/m$^3$ and 600 kg/m$^3$.

14. The gas engine system of claim 12 wherein the activated carbon filter has a density of substantially 500 kg/m$^3$.

15. The gas engine system of claim 1 wherein the first regenerator comprises a heater located apart from the gas engine for heating the first adsorption agent.

16. The gas engine system of claim 1 wherein the heater comprises at least one electrical heating element.

17. The gas engine system of claim 1 wherein the heater is adapted to heat the adsorption agent to a temperature of between 350 degrees C and 450 degrees C.

18. The gas engine system of claim 1 wherein the first adsorption agent is disposed in a container having walls provided with heat insulation.

19. The gas engine system of claim 1 further comprising a radiator positioned outside the first adsorption agent for cooling the first adsorption agent, a valve for providing gas from the first adsorption agent to the radiator, and a circulation fan to circulate gas passing through the first adsorption agent and through the radiator in a closed circuit.

20. The gas engine system of claim 19 further comprising a second cleaner for cleaning propellant gas as it passes through the propellant gas feed line, the second cleaner comprising a second adsorption agent for adsorbing impurities or accompanying substances from propellant gas, a second regenerator for regenerating the second adsorption agent, the second regenerator comprising piping adapted for passing a combustible flushing gas through the second adsorption agent, and a burner for subsequent combustion of flushing gas and any impurity or accompany substance entrained by flushing gas out of the second adsorption agent, wherein propellant gas to be cleaned can be passed selectively either by way of the first cleaner while the second adsorption agent is being regenerated, or by way of the second cleaner while the first adsorption agent is being regenerated.

21. The gas engine system of claim 19 further comprising an exhaust gas tract connected to the gas engine, and an exhaust gas catalytic converter arranged in the exhaust gas tract.

* * * * *